United States Patent
Steindl et al.

(10) Patent No.: US 6,932,297 B1
(45) Date of Patent: Aug. 23, 2005

(54) SELF-LOCATING FASTENING ASSEMBLY AND METHOD FOR INTEGRATING A MONUMENT WITHIN AN AIRCRAFT

(75) Inventors: David R. Steindl, Seattle, WA (US); Patrick W. Lucky, Shoreline, WA (US); Jay W. Colacecchi, Lake Stevens, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/708,819

(22) Filed: Mar. 26, 2004

(51) Int. Cl.[7] .............................................. B64D 9/00
(52) U.S. Cl. .................. 244/118.1; 248/680; 248/507; 248/148; 410/80
(58) Field of Search ............................ 244/118.1, 120; 410/69, 70, 76, 77, 80, 85, 90, 91, 94, 101, 410/106, 112; 361/732, 609; 248/503, 501, 248/500, 680, 507, 148; 312/351.1; 403/361, 403/334

(56) References Cited

U.S. PATENT DOCUMENTS

| | | | |
|---|---|---|---|
| 670,763 A | * | 3/1901 | Brodeur .................... 248/680 |
| 1,770,066 A | * | 7/1930 | Christophel ................ 248/507 |
| 4,456,414 A | * | 6/1984 | Williams .................... 410/80 |
| 4,736,910 A | * | 4/1988 | O'Quinn et al. ............ 244/120 |
| 4,805,859 A | * | 2/1989 | Hudson ...................... 248/148 |
| 5,518,207 A | * | 5/1996 | Nordstrom et al. ...... 244/129.5 |
| 5,575,439 A | * | 11/1996 | Heinze et al. .............. 244/131 |

* cited by examiner

Primary Examiner—Galen Barefoot
(74) Attorney, Agent, or Firm—Vincent C. Ilagan, Esq.; Artz & Artz, P.C.

(57) ABSTRACT

One advantageous embodiment of the present invention is a self-locating fastening assembly (14) for aligning and securing a monument (12) to an airframe (16) of an aircraft (10). This self-locating fastening assembly (14) includes a self-locating tie-down member (24), which is fixedly coupled to one of either the air-frame (16) or the monument (12). The self-locating fastening assembly (14) further includes a socket member (26), which is coupled to the other of the airframe (16) or the monument (12). The self-locating tie-down member (24) includes a base portion (32) and a top portion (34) extending from the base portion (32). The base portion (32) is utilized for contacting the socket member (26) so as to guide said self-locating tie-down member into said socket member and secure the monument (12) in a predetermined position along at least one direction. Moreover, the top portion (34) is utilized for further securing the self-locating tie-down member (24) to the socket member (26).

39 Claims, 4 Drawing Sheets

SELF-LOCATING FASTENING ASSEMBLY AND METHOD FOR INTEGRATING A MONUMENT WITHIN AN AIRCRAFT

BACKGROUND OF INVENTION

The present invention relates generally to aircrafts and construction thereof, and more particularly to a self-locating fastening assembly for integrating a monument within an aircraft.

Aircraft manufacturers are well known for integrating a variety of monuments onto floors within the interiors of the aircrafts. Examples of these monuments include lavatories, galleys, closets, purser work stations, video control centers, and crew rests. Prior to installation, the mechanics ordinarily spend a substantial amount of time preparing the floor with liquid sealants. Thereafter, the monuments typically are installed onto secondary structural members, e.g. intercostals, between floor beams of the floor. In addition, a series of threaded fasteners usually are utilized in combination with the secondary structures for securing the monuments to the aircraft. One skilled in the art will understand that a substantial number of these fasteners can be required for installing the monuments in the aircraft. For these reasons, the installation process can be a time-consuming and expensive.

It would therefore be desirable to provide an improved fastener assembly and method for installing monuments within aircraft interiors, especially an assembly and method that is less expensive and less time-consuming to install.

SUMMARY OF INVENTION

One embodiment of the present invention is a self-locating fastening assembly for aligning and securing a monument to an airframe of an aircraft. In this embodiment, the self-locating fastening assembly includes a socket member, which is fixedly coupled to one of either the airframe or the monument. The self-locating fastening assembly further includes a self-locating tie-down member, which is coupled to the other of the airframe or the monument. The self-locating tie-down member includes a base portion and a top portion extending from the base portion. The top portion is utilized for guiding the self-locating tie-down member into the socket member. Also, the base portion is utilized for engaging the socket member so as to secure the monument in a predetermined position along at least one direction.

One advantage of the invention is that a self-locating fastening assembly is provided that can require a monument to be installed onto an airframe only within a predetermined position thereby improving quality assurance.

Another advantage of the invention is that a self-locating fastening assembly is provided that can minimize the need for jigs, fixtures, and other tools, which hold a monument in proper position for installation in an aircraft.

Yet another advantage of the invention is that a self-locating fastening assembly is provided that can decrease the wear experienced by various fastener-applicator tooling thereby decreasing maintenance of that tooling and costs associated therewith.

Still another advantage of the invention is that a self-locating fastening assembly is provided that can decrease the manufacturing cycle time and costs associated therewith.

Yet another advantage of the present invention is that a self-locating fastening assembly is provided that can eliminate the need for threaded fasteners and decreases the number of secondary structural members required to install the monument in the aircraft.

Still another advantage of the present invention is that a self-locating assembly is provided that substantially decreases the amount of floor preparation required before installing the monument onto the floor.

Yet another advantage of the invention is that a self-locating fastening assembly is provided that eliminates tie-down attachments and/or threaded fasteners within the wet area under plumbed monuments, e.g. the galleys and the lavatories, thereby decreasing the risk of structural corrosion.

The features, functions, and advantages can be achieved independently and in various embodiments of the present invention or may be combined in yet other embodiments.

BRIEF DESCRIPTION OF DRAWINGS

For a more complete understanding of this invention, reference should now be made to the embodiments illustrated in greater detail in the accompanying drawings and described below by way of examples of the invention.

DETAILED DESCRIPTION

In the following figures the same reference numerals will be used to illustrate the same components in the various views. The embodiments described herein employ features where the context permits, e.g. when a specific result or advantage of the claimed invention is desired. However, a variety of other embodiments are contemplated having different combinations of the described features, having features other than those described herein, or even lacking one or more of the described features. Specifically, the embodiments described herein implement a self-locating fastening assembly for installing a monument within an aircraft. Yet, it is contemplated that the self-fastening assembly can be utilized for various other suitable applications and environments as desired. For these reasons, it is understood that the invention can be carried out in various modes.

Figure 1A:
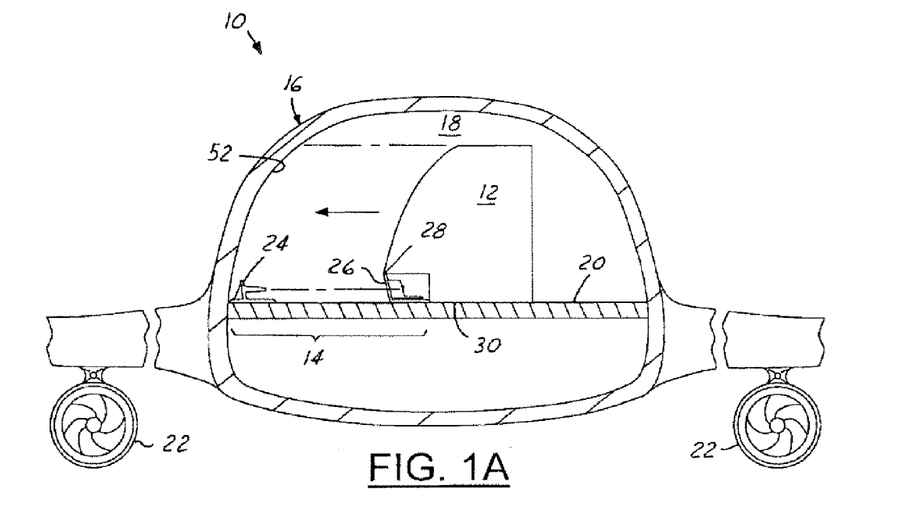
FIG. 1A is a cross-sectional view of an airplane with a monument placed therein prior to utilizing a self-locating fastening assembly to secure the monument to the airplane, according to one advantageous embodiment of the claimed invention.
Figure 1B:
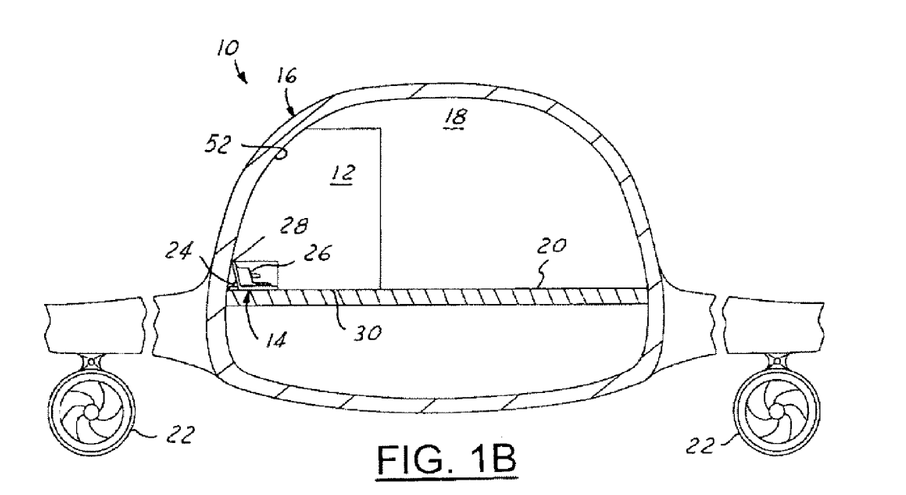
FIG. 1B is a cross-sectional view of the airplane shown in FIG. 1A, illustrating the monument secured in place.

Referring to FIGS. 1A and 1B, there is shown a cross-sectional view of an airplane 10 with a monument 12 being secured therein via a self-locating fastening assembly 14, according to one advantageous embodiment of the claimed invention. This airplane 10 is comprised of an air-frame 16 with an interior 18 and a floor 20 disposed within the interior 18. Also, the airframe 16 has one or more suitable engines 22 known in the art mounted thereon. Examples of the monument 12 include galleys, lavatories, closets, purser work stations, video control centers, crew work stations, and various other suitable monuments.

Specifically, FIG. 1A illustrates the floor having a monument 12 placed thereon prior to securing the monument 12 to the floor 20. Additionally, FIG. 1B illustrates the monument 12 moved across the floor 20 in a substantially outboard direction so as to utilize the self-locating fastening assembly 14 (detailed in the descriptions for FIGS. 3A–4) to secure the monument 12 to the floor 20.

Figure 2A:
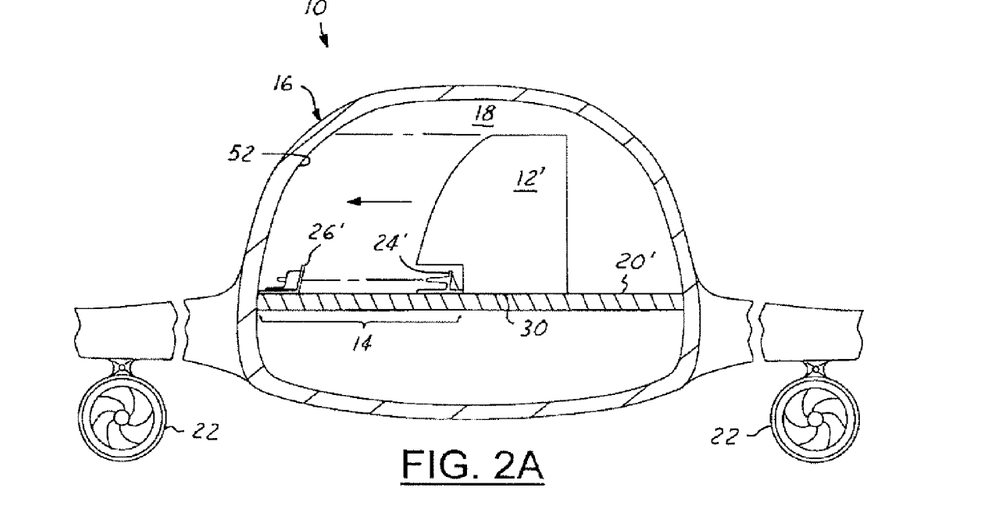
FIG. 2A is a cross-sectional view of the airplane shown in FIG. 1A, according to another advantageous embodiment of the claimed invention.
Figure 2B:
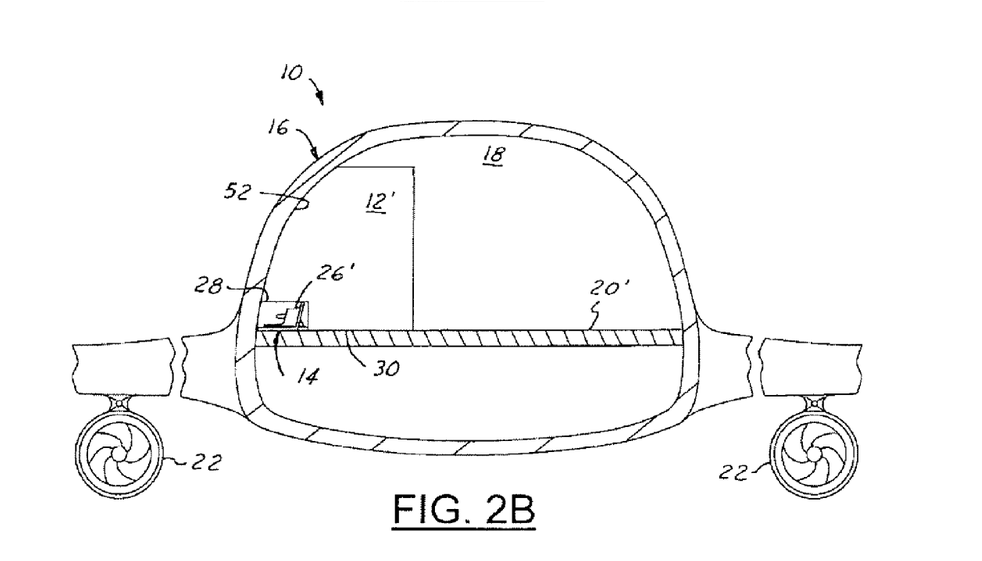
FIG. 2B is a cross-sectional view of the airplane shown in FIG. 2A, illustrating the monument secured to the airplane via the self-locating fastening assembly.

In this embodiment, the self-locating fastening assembly 14 is comprised of a self-locating tie-down member 24, which is coupled to the floor 20, and a socket member 26, which is coupled to the monument 12. The socket member 26 is utilized for receiving and engaging the self-locating tie-down member 24. In another embodiment exemplified in FIGS. 2A and 2B, the self-locating tie-down member 24" and the socket member 26" are instead respectively coupled to the monument 12" and the floor 20".

Referring back to FIGS. 1A and 1B, the socket member 26 is coupled to the monument 12 adjacent to an out-board edge 28 of a bottom surface 30 of the monument 12. In this respect, the central portion of the monument floor can remain intact without any threaded fasteners or other tie-down features comprising the structural integrity of that central portion of the monument floor. For that reason, plumbed monuments, eg. galleys and lavatories, can have uncompromised wet areas that do not leak and cause structural corrosion to the floor and other portions of the airframe.

However, it will be appreciated that the socket member 26 can be positioned in various other suitable locations on the monument 12 as desired. Furthermore, it is also understood that the socket member 26 can instead be defined by the monument 12 itself and therefore be an integral part of the monument 12.

The self-locating tie-down member 24 is coupled to the floor 20 adjacent to a sidewall 52 of the airframe 16 and located in a predetermined position for inserting into the socket member 26. For this reason, the self-locating fastening assembly 14 can dispense with the need for jigs, fixtures, and various other tooling for precisely locating the monument 12 in the predetermined position. As a result, the self-locating fastening assembly 14 can decrease manufacturing cycle time, minimize costs associated therewith, improve quality assurance, and generally provide for lean manufacturing.

In addition, the self-locating fastening assembly 14 is utilized for fixedly attaching the monument 12 to the airframe 16 in the predetermined position along a forward direction, a rearward direction, an upward direction, a downward direction, an outboard direction, or any suitable combination thereof. However, it will be appreciated that the self-locating fastening assembly 14 can secure the monument 12 in more or less directions as desired. In this regard, substantially less secondary structural members and threaded fasteners can be required for securing the monument 12 to the airframe 16 as would have otherwise been required without the self-locating fastening assembly 14. One skilled in the art will understand that this feature decreases the number of holes to be drilled, increases the life of drill tooling, decreases the amount of airplane floor preparation, minimizes the overall installation cycle time, lowers the costs associated therewith, and further provides for a lean manufacturing process.

Figure 3A:
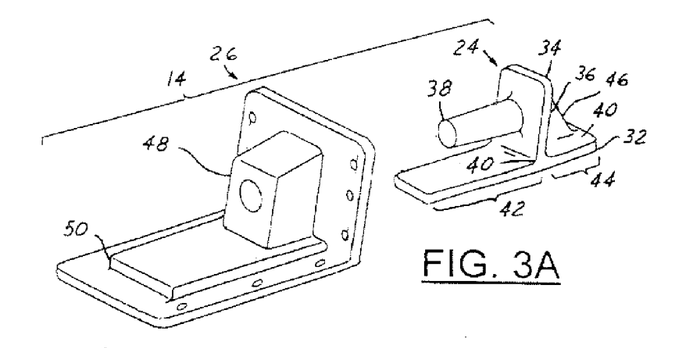
FIG. 3A is an exploded view of the self-locating fastening assembly shown in FIG. 1A, illustrating the self-locating fastening assembly including a self-locating tie-down member and a socket member.
Figures 3B, 4, 5, 6:
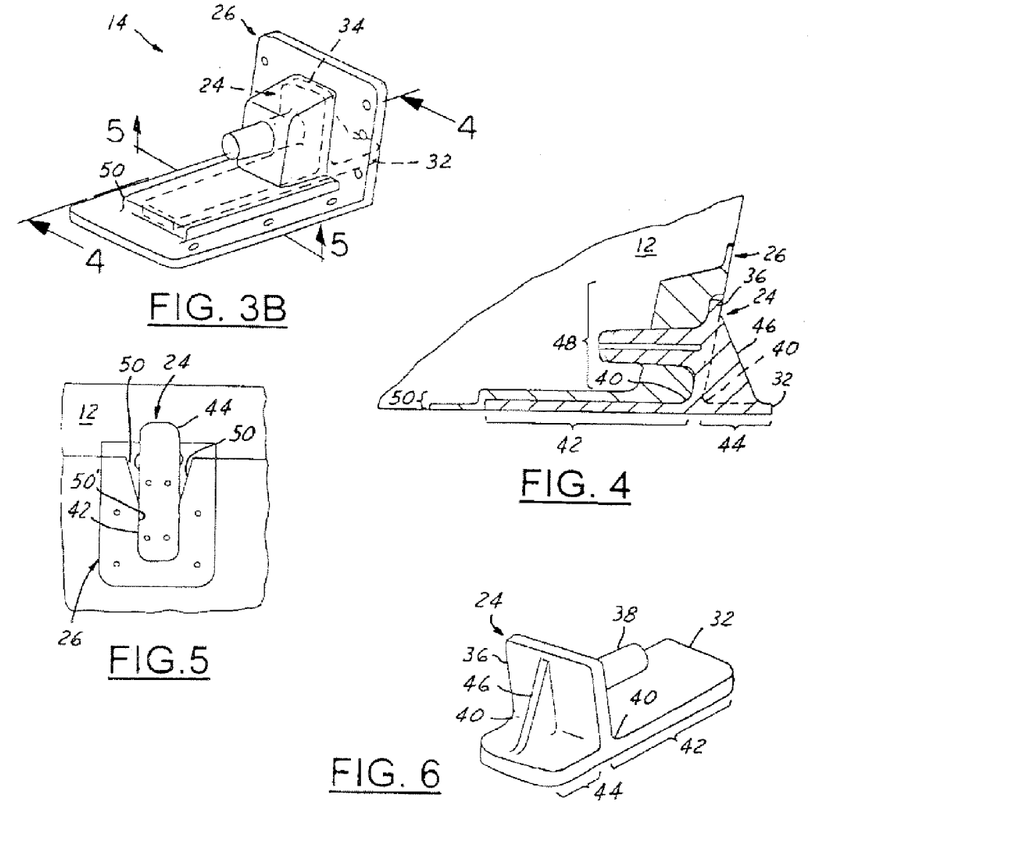
FIG. 3B is an assembled view of the self-locating fastening assembly shown in FIG. 3A.
FIG. 4 is a cross-sectional view of the self-locating tie-down member shown in FIG. 3B, as taken along line 4—4.
FIG. 5 is a cross-sectional view of the self-locating tie-down member shown in FIG. 3B, as taken along line 5—5.
FIG. 6 is a perspective view of the self-locating tie-down member shown in FIG. 3A, illustrating an out-board-extending tab protruding from the self-locating tie-down member.

Referring now to FIGS. 3A and 3B, there are respectively shown exploded and assembled views of the self-locating fastening assembly 14 shown in FIGS. 1A and 1B. As introduced above, the self-locating fastening assembly 14 includes a self-locating tie-down member 24 and a socket member 26 for receiving the self-locating tie-down member 24.

As best shown in FIG. 3A, the self-locating tie-down member 24 includes a base portion 32 and a top portion 34 extending from the base portion 32. In this embodiment, the top portion 34 is comprised of an offset tab 36, which extends from the base portion 32, and a finger member 38, which extends from the offset tab 36. The offset tab 36 extends substantially perpendicularly from the base portion 32 with fillets 40 at the intersection between the offset tab 36 and the base portion 32. These fillets 40 strengthen the top portion 34 of the self-locating tie-down member 24. However, it will be appreciated that the offset tab 36 can extend from the base portion 32 by various other suitable angles with or without fillets 40 as desired. Furthermore, the finger member 38 extends substantially perpendicularly from the offset tab 36 and has a central axis, which is aligned with a longitundal axis of the base portion 32. In this way, the finger member 38 is positioned substantially parallel to the base portion 32 at a predetermined offset distance from the base portion 32. Yet, it is also contemplated that the finger member 38 can be positioned in a variety of other suitable orientations as desired.

In this embodiment, the finger member 38 has a generally conical shape that tapers in diameter from the offset tab 36. However, it is understood that the finger member 38 can have various other suitable shapes as desired. As detailed in the description for FIGS. 4–7, the finger member 38 is utilized for contacting the socket member 26 and inserting the self-locating tie-down member 24 into the socket member 26 to secure the monument 12 in the predetermined position.

Referring now to FIGS. 3A and 4, the base portion 32 is comprised of an inboard-extending tab 42, which protrudes substantially perpendicularly from the offset tab 36, and an outboard-extending tab 44, which protrudes from the offset tab 36 in a substantially opposite direction as the inboard-extending tab 42. However, it will be appreciated that the inboard-extending tab 42 and the outboard-extending tab can extend from the offset tab 36 by various other suitable angles as desired. Additionally, it is understood that the outboard-extending tab 44 can also be omitted as desired.

In this embodiment, the inboard-extending tab 42 and/or the outboard-extending tab 44 are coupled to the floor 20 within the interior 18 of the airframe 16 so as to guide the self-locating tie-down member 24 into the socket member 26 and locate the monument 12 within the interior in the predetermined position. However, it is understood that the base portion 32 can instead be coupled to various other suitable portions of the airframe 16 as desired. This is accomplished by a welding attachment, various other suitable fasteners, or any combination thereof as desired. It is also contemplated that the base portion 32 and the top portion 34 of the self-locating tie-down member 24 can actually be a parts of the floor 20 or other portions of the airframe 16 themselves and therefore not require attachment by fasteners. As detailed in the description for FIGS. 5 and 6, the inboard-extending tab 42 is sized for inserting into the socket member 26 and securing the monument 12 to the floor 20 in the predetermined position.

As best shown in FIGS. 4 and 6, the base portion 32 further includes a reinforcing rib 46 coupled between the offset tab 36 and the outboard-extending tab 44. In this way, the reinforcing rib 46 strengthens the top portion 34 of the self-locating tie-down member 24. This feature is beneficial because it can prevent the top portion 34 from being deformed and being therefore improperly oriented for engaging the socket member 26 to the self-locating tie-down member 24 in the predetermined position.

Referring now to FIGS. 4 and 5, there are shown cross-sectional views of the self-locating fastening assembly 14, shown in FIG. 3B, as respectively taken along lines 4—4 and 5—5. The socket member 26 includes a top chamber 48 and a base chamber 50 positioned adjacent to the top chamber 48. This further movement can indicate to an engineer or other installation operator that the monument 12 is substantially close to its ultimate predetermined position within the airframe 16. The base chamber 50 is sized for receiving the base portion 32 of the self-locating tie-down member 24, guiding the self-locating tie-down member 24 into the socket number 26, and restricting movement of the base portion 32 in one or more directions. To that end, the base chamber 50 has a tapered opening 50" for allowing a misaligned tie-down member 24 to automatically slide into correct alignment. Also, the base chamber 50 of the socket member 26 is utilized for preventing the base portion 32 of the self-locating tie-down member 24 from moving in a forward direction, a rearward direction, an upward direction, a downward direction, an outboard direction, or any suitable combination thereof. In other words, the base chamber 50 is utilized to restrict movement of the self-locating tie-down member 24 and the monument 12 attached thereto in one or more directions. As a result, the base chamber 50 of the socket member 26 can be utilized in combination with a substantially low number of fasteners, e.g. bolt fasteners, for securing the monument 12 in the predetermined position. Moreover, the top chamber 48 is utilized for receiving the finger member 38 and allowing the self-locating tie-down member 24 to move closer toward the socket member in a fastening engagement. For instance, the top chamber 48 can receive the finger member 38 and allow the monument to move further outboard.

This self-locating tie-down member 24 is formed of a high-strength metal material by a die cast process. However, it will be appreciated that the self-locating tie-down member 24 can be compromised of various other suitable high-strength materials and can be manufactured by a steelmaking process, a rolling process, a forging process, an extrusion process, a drawing process, a welding process, or any combination thereof as desired. Furthermore, the socket member 26 is manufactured of a high-strength metal material by a drawing process. However, it is understood that the socket member 26 can be made of various other suitable high-strength materials and can be manufactured by a steelmaking process, a rolling process, a forging process, an extrusion process, a drawing process, a casting process, a welding process, or any combination thereof as desired.

Figure 7:
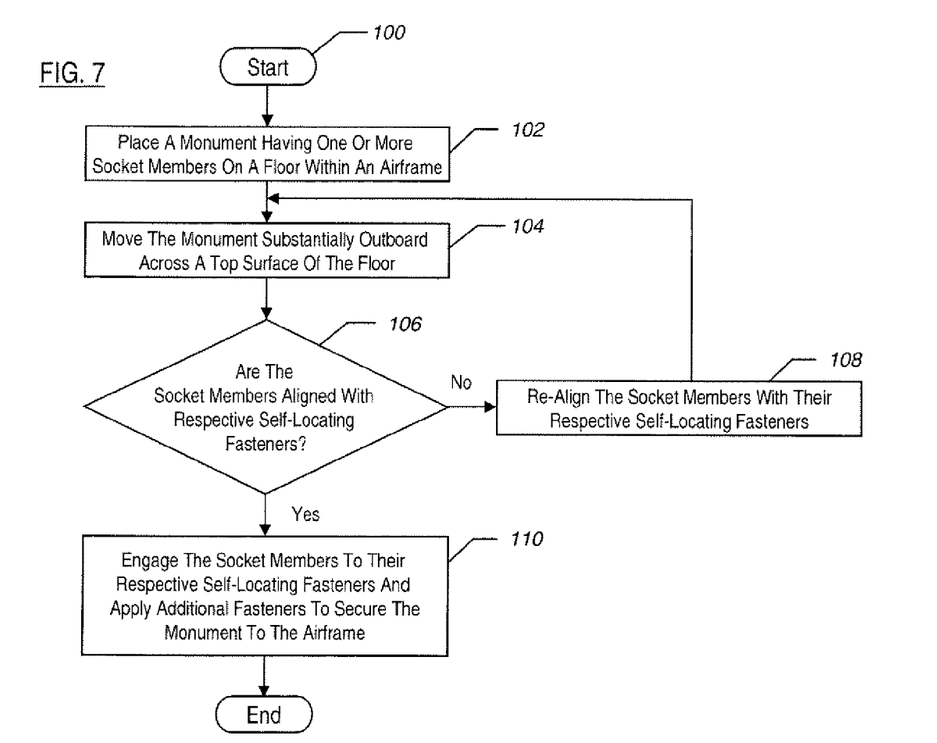
FIG. 7 is a logic flow diagram showing a method for utilizing the self-locating fastening assembly, as shown in FIGS. 1A and 1B, for installing the monument in the aircraft.

Referring now to FIG. 7, there is shown a logic flow diagram illustrating a method for utilizing the self-locating fastening assembly 14, shown in FIGS. 1A and 1B, to install the monument 12 in the airplane 10. As explained hereinabove, it is contemplated that the self-locating fastening assembly 14 can be utilized for securing a variety of items together other than the monument 12 and the airframe 16 of the airplane 10. The method commences in step 100 and then immediately proceeds to step 102.

In step 102, the monument 12 with one or more of the socket members 26 is placed on the floor 20 of the airplane 10 This step is accomplished by operating a forklift, a crane, a pulley mechanism, other suitable lifting devices, or any combination thereof to lift the monument 12 into the airframe 16 of the airplane 10. Then, the sequence proceeds to step 104.

In step 104, the monument 12 is moved in a substantially outboard direction along one or more guide lines (not shown) that are etched, scribed, or otherwise marked on the floor. In this way, the socket members 26 are moved in closer proximity to their respective the self-locating tie-down members 24. This step is accomplished by sliding the bottom surface 30 of the monument 12 across the floor 20 in the substantially outboard direction until no further movement is possible. However, it is understood that other suitable methods can be utilized for moving the socket members 26 into a fastening engagement with the self-locating tie-down members 24. The sequence then proceeds to step 106.

In step 106, an engineer or other installation operator determines whether the socket members 26 on the monument 12 are properly aligned with their respective self-locating tie-down members 24. This step is accomplished by requiring the engineer to measure the gap between the monument 12 and a sidewall 52 of the airframe 16.

If this gap is substantially equal to the length of the finger member 38 or the outboard-extending tab 44 of the self-locating tie-down member 24, then the sequence proceeds to step 108. In step 108, the engineer determines that the monument 12 is not properly aligned for inserting the self-locating tie-down members 24 into their respective socket members 26. In that regard, the monument 12 is not positioned for being secured to the air-frame in the predetermined position. For this reason, the engineer visually determines the locations of the socket members 26 in relation to their respective self-locating tie-down members 24 and then re-aligns the monument 12 accordingly. It is contemplated that various other suitable methods can be utilized for determining how to realign the socket members 26 with their respective self-locating tie-down members 24. Then, the sequence returns to step 104.

If, however, the gap is substantially shorter than the length of the finger member 38 and the outboard-extending tab 44, then the sequence proceeds to step 110. It will be appreciated that other suitable methods can be utilized for determining whether the socket members 26 are sufficiently aligned for receiving their respective self-locating tie-down members 24. In step 110, additional fasteners are applied to the monument 12 and the air-frame 16 to secure the monument 12 to the airframe 16 in the predetermined position.

While particular embodiments of the invention have been shown and described, numerous variations and alternate embodiments will occur to those skilled in the art. Accordingly, it is intended that the invention be limited only in terms of the appended claims.

What is claimed is:

1. An aircraft comprising:
an airframe having an interior with a floor disposed therein;

a monument coupled to said airframe and being disposed on said floor within said interior of said air-frame;

a self-locating fastening assembly for securing said monument in a predetermined position along at least one direction within said interior, said self-locating fastening assembly including a self-locating tie-down member coupled to said airframe and a socket member integrated within said monument and sized for receiving said self-locating tie-down member;

wherein said self-locating tie-down member includes a base portion and a top portion extending from said base portion;

wherein said base portion is coupled to said floor and is utilized for contacting said socket member, securing said monument in a predetermined position along at least one direction, and guiding said self-locating tie-down member into said socket member;

wherein said top portion extends from said base portion and is utilized for further securing said monument in said predetermined position;

wherein said monument is at least one of a lavatory module, a galley module, a closet module, a purser work station module, a video control center module, and a crew rest module.

2. The aircraft of claim 1 wherein said monument has a bottom surface for sliding across said top surface of said floor and inserting said self-locating tie-down member into said socket member.

3. The aircraft of claim 1 wherein said socket member is disposed at an edge of said monument adjacent to said bottom surface of said monument.

4. The aircraft of claim 1 wherein said socket member is defined by said monument and is an integral part thereof.

5. The aircraft of claim 1 wherein said socket member is coupled to said monument.

6. The aircraft of claim 1 wherein said socket member defines a guiding chamber for contacting said top portion of said self-locating tie-down member and sewing said self-locating tie-down member to said socket member.

7. The aircraft of claim 1 wherein said socket member defines a base chamber for receiving and contacting said base portion of said self-locating tie-down member so as to secure said monument in said predetermined position.

8. The aircraft of claim 1 wherein said top portion comprises:

an offset tab extending generally perpendicularly from said base portion; and a finger member extending generally perpendicularly from said offset tab and utilized for securing said self-locating tie-down member to said socket member, said finger member positioned generally parallel to said base portion.

9. The aircraft of claim 8 further comprising:

at least one fillet coupled between said base portion and said offset tab for strengthening said top portion.

10. The aircraft of claim 8 wherein said finger member has a central axis that is centered above a longitudinal axis of said base portion.

11. The aircraft of claim 1 wherein said base portion includes an inboard-extending tab sized for insertion into said socket member, guiding said self-locating tie-down member into said socket member, and securing said monument in said predetermined position.

12. The aircraft of claim 11 wherein said base portion further includes:

an outboard-extending tab for supporting said top portion in an inboard direction.

13. The aircraft of claim 12 further comprising:

a reinforcing rib coupled between said outboard-extending tab and said offset tab, said reinforcing rib for strengthening said top portion.

14. An aircraft comprising:

an airframe having an interior with a floor disposed therein;

a monument coupled to said airframe and being disposed on said floor within said interior of said air-frame;

a self-locating fastening assembly for securing said monument in a predetermined position along at least one direction within said interior, said self-locating fastening assembly including a self-locating tie-down member coupled to said airframe and a socket member integrated within said monument and sized for receiving said self-locating tie-down member;

wherein said self-locating tie-down member includes a base portion and a top portion extending from said base portion;

wherein said base portion is coupled to said monument and is utilized for contacting said socket member, guiding said self-locating tie-down member into said socket member, and securing said monument in a predetermined position along at least one direction within said interior;

wherein said top portion extends from said base portion and is utilized for further securing said self-locating tie-down member to said socket member in a direction substantially parallel to a top surface of said floor;

wherein said monument is at least one of a lavatory module, a galley module, a closet module, a purser work station module, a video control center module, and a crew rest module.

15. The aircraft of claim 14 wherein said monument has a bottom surface for sliding across said top surface of said floor and inserting said self-locating tie-down member into said socket member.

16. The aircraft of claim 14 wherein said self-locating tie-down member is disposed at an edge of said monument adjacent to said bottom surface of said monument.

17. The aircraft of claim 14 wherein said socket member defines a guiding chamber for contacting said top portion of said self-locating tie-down member and securing said self-locating tie-down member to said socket member.

18. The aircraft of claim 14 wherein said socket member defines a base chamber for receiving and contacting said base portion of said self-locating tie-down member so as to guide said self-locating tie-down member into said socket member and secure said monument in said predetermined position.

19. The aircraft of claim 14 wherein said top portion comprises:

an offset tab extending from said base portion; and a finger member extending from said offset tab and utilized for securing said self-locating tie-down member to said socket member.

20. The aircraft of claim 14 wherein said base portion comprises:

an inboard-extending tab sized for inserting into said socket member, guiding said self-locating tie-down member into said socket member, and securing said monument in said predetermined position.

21. The aircraft of claim 20 wherein said base portion further comprises:

an outboard-extending tab for strengthening said top portion.

22. The aircraft of claim 21 further comprising:
a reinforcing rib coupled between said outboard-extending tab and said offset tab, said reinforcing rib for strengthening said top portion.

23. A self-locating fastening assembly for aligning and securing a monument to a floor within an interior of an airframe for an aircraft, comprising:
a self-locating tie-down member coupled to one of the floor and the monument; and
a socket member coupled to the other of the floor and the monument;
wherein said self-locating tie-down member includes a base portion and a top portion extending from said base portion, said base portion utilized for contacting said socket member so as to guide said self-locating tie-down member into said socket member and secure the monument in a predetermined position along at least one direction, said top portion utilized for securing the self-locating tie-down member to the socket member.

24. The self-locating fastening assembly of claim 23 wherein said socket member defines a guiding chamber for contacting said top portion of said self-locating tie-down member and securing said self-locating tie-down member to said socket member.

25. The self-locating fastening assembly of claim 23 wherein said socket member defines a base chamber for receiving and contacting said base portion of said self-locating tie-down member so as to guide said self-locating tie-down member into said socket member and secure the monument in said predetermined position.

26. The self-locating fastening assembly of claim 23 wherein said base chamber has a tapered opening for aligning a misaligned self-locating tie-down member and allowing said self-locating tie-down member to fully engage said socket member.

27. The self-locating fastening assembly of claim 23 wherein said top portion comprises:
an offset tab extending from said base portion; and
a finger member extending from said offset tab and utilized for securing said self-locating tie-down member to said socket member.

28. The self-locating fastening assembly of claim 27 wherein said finger member has a conical shape with a rounded tip.

29. The self-locating fastening assembly of claim 27 wherein said base portion comprises:
an inboard-extending tab sized for inserting into said socket member, guiding said self-locating tie-down member into said socket member, and securing the monument in said predetermined position.

30. The self-locating fastening assembly of claim 29 wherein said base portion further comprises:
an outboard-extending tab for strengthening said top portion.

31. The self-locating fastening assembly of claim 30 further comprising:
a reinforcing rib coupled between said outboard-extending tab and said offset tab, said reinforcing rib for strengthening said top portion.

32. The self-locating fastening assembly of claim 23 in which the socket member is manufactured by a process selected from the group consisting of a steelmaking process, a rolling process, a forging process, an extrusion process, a drawing process, a casting process, and a welding process.

33. The self-locating fastening assembly of claim 23 in which the self-locating tie-down member is manufactured by a process selected from the group consisting of a steelmaking process, a rolling process, a forging process, an extrusion process, a drawing process, a casting process, and a welding process.

34. A method for securing a monument to a floor of an airframe within an interior of an aircraft, comprising:
placing the monument on the floor of the air-frame;
moving the monument in an outboard direction across a top surface of the floor;
inserting a self-locating tie-down member coupled to the floor into a socket member coupled to the monument;
aligning the monument in a predetermined position; and
securing the monument to the floor in said predetermined position.

35. The method of claim 34 wherein inserting said self-locating tie-down member into said socket member comprises:
inserting a top portion of said self-locating tie-down member into a top chamber of said socket member; and
inserting a base portion of said self-locating tie-down member into a base chamber of said socket member.

36. The method of claim 35 wherein inserting said top portion into said top chamber comprises:
inserting a finger member of said top portion into said top chamber.

37. The method of claim 35 wherein inserting said base portion into said base chamber comprises:
inserting an inboard-extending tab of said base portion into said base chamber.

38. The method of claim 35 wherein moving the monument in an outboard direction across a top surface of the floor comprises:
moving the monument along at least one guide line marked on the floor.

39. The method of claim 35 further comprising:
measuring a gap between the monument and a sidewall;
determining whether the monument requires realignment; and
realigning the monument when the monument requires re-alignment.

* * * * *

UNITED STATES PATENT AND TRADEMARK OFFICE
CERTIFICATE OF CORRECTION

PATENT NO.   : 6,932,297 B1  
DATED        : August 23, 2005  
INVENTOR(S)  : Steindl et al.

It is certified that error appears in the above-identified patent and that said Letters Patent is hereby corrected as shown below:

Column 7,
Line 38, replace "sewing" with -- securing --.

Signed and Sealed this

Eighth Day of November, 2005

JON W. DUDAS  
*Director of the United States Patent and Trademark Office*